US009881571B2

(12) United States Patent
Hwang et al.

(10) Patent No.: US 9,881,571 B2
(45) Date of Patent: Jan. 30, 2018

(54) 3D IMAGE DISPLAY APPARATUS AND DRIVING METHOD THEREOF (71) Applicant: Samsung Display Co., Ltd., Yongin (KR)

(72) Inventors: Hyun Sik Hwang, Hwaseong-si (KR); Jung-Won Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 726 days.

(21) Appl. No.: 14/274,136

(22) Filed: May 9, 2014

(65) Prior Publication Data

US 2015/0062189 A1    Mar. 5, 2015

(30) Foreign Application Priority Data

Sep. 4, 2013  (KR) ........................ 10-2013-0106242

(51) Int. Cl.
*G09G 3/36* (2006.01)
*G09G 3/00* (2006.01)
*H04N 13/04* (2006.01)
*G09G 3/34* (2006.01)

(52) U.S. Cl.
CPC ........... *G09G 3/3648* (2013.01); *G09G 3/003* (2013.01); *G09G 3/3406* (2013.01); *G09G 2310/063* (2013.01); *G09G 2320/0626* (2013.01); *H04N 13/0438* (2013.01)

(58) Field of Classification Search
CPC ....... G09G 2320/0233; G09G 2340/16; H04N 13/0438; G02B 27/2207
See application file for complete search history.

(56) References Cited

U.S. PATENT DOCUMENTS

| 6,476,786 | B1 | 11/2002 | Miyachi |
| 2008/0055216 | A1 | 3/2008 | Yen et al. |
| 2009/0128534 | A1 | 5/2009 | Fish et al. |
| 2011/0115998 | A1 | 5/2011 | Liao et al. |
| 2011/0234560 | A1 | 9/2011 | Shin et al. |

(Continued)

FOREIGN PATENT DOCUMENTS

| KR | 10-2010-0122661 | 11/2010 |
| KR | 10-2011-0139088 | 12/2011 |
| KR | 10-2012-0054253 | 5/2012 |

(Continued)

*Primary Examiner* — Amare Mengistu
*Assistant Examiner* — Shawna Stepp Jones
(74) *Attorney, Agent, or Firm* — H.C. Park & Associates, PLC (57) ABSTRACT An image display control unit in a three-dimensional image display apparatus is configured to drive gate lines and the data lines so as to provide the display panel with a left eye image signal during a first frame in which a right eye image signal is displayed on the display panel, and with the right eye image signal during a second frame in which the left eye image signal is displayed on the display panel. During the first frame, each of the pixels provides a second capacitor with the right eye image signal, and a first capacitor with the left eye image signal. During the second frame, each of the pixels provides the first capacitor with the right eye image signal, and the second capacitor with the left eye image signal. A backlight unit maintains a turn-on state during the first and second frames.

20 Claims, 6 Drawing Sheets (56) References Cited

U.S. PATENT DOCUMENTS

2012/0013596 A1     1/2012  Kim et al.
2012/0320016 A1*   12/2012  Hirata ................ G02B 27/2264
                                                              345/208

FOREIGN PATENT DOCUMENTS

KR     10-2012-0094312         8/2012
KR     10-2012-0110601        10/2012

* cited by examiner

<SCP>

Fig. 5

<RSP>

3D IMAGE DISPLAY APPARATUS AND DRIVING METHOD THEREOF

CROSS-REFERENCE TO RELATED APPLICATION

This application claims priority from and the benefit of Korean Patent Application No. 10-2013-0106242, filed Sep. 4, 2013, which is hereby incorporated by reference for all purposes as if fully set forth herein.

BACKGROUND

Field

Exemplary embodiments of the present invention relate to a display apparatus, and more particularly, to a three-dimensional image display apparatus capable of displaying a three-dimensional image.

Discussion of the Background

A general display apparatus displays an image in a two-dimensional manner. As demand for a three-dimensional image is increased in various fields, such as movies, medical images, games, advertisements, education, the military, etc., a three-dimensional display apparatus is being developed.

A three-dimensional image display apparatus displays a three-dimensional image using a binocular parallax principle, as does both eyes of a human. For example, since both eyes of a human are spaced apart from each other, images seen through respective eyes in different angles are provided to the brain. The three-dimensional image display apparatus enables a viewer to experience a three-dimensional effect. That is, the viewer recognizes a sense of spatiality through the three-dimensional image display apparatus.

The three-dimensional image display apparatus is divided into a stereoscopic type and an auto stereoscopic type, according to whether a viewer wears special glasses. The auto stereoscopic type may include a barrier arrangement, a lenticular arrangement, etc. The stereoscopic type may include a polarization arrangement, a shutter glass arrangement, etc. In particular, the shutter glass manner realizes a three-dimensional image by alternately opening and closing a left eye shutter and a right eye shutter in synchronization with a time point when a left eye image and a right eye image is displayed on a display panel by a frame unit. When a liquid crystal display apparatus is implemented by a three-dimensional image display apparatus, a left eye image of a left eye period affects a right eye image of a right eye period resulting from a slow response speed of a liquid crystal when the left eye image is displayed on the display panel during the left eye period, and then the right eye image is displayed on the display panel during the right eye period. Image quality is reduced when an image of a previous frame affects an image of a next frame. When a black image is inserted between a left eye image and a right eye image to prevent reduction of image quality, a reduction of brightness of a three-dimensional image results.

The above information disclosed in this Background section is only for enhancement of understanding of the background of the invention and, therefore, it may contain information that does not form the prior art that is already known in this country to a person of ordinary skill in the art.

SUMMARY

Exemplary embodiments of the present invention provide a three-dimensional image display apparatus capable of displaying a three-dimensional image.

Additional features will be set forth in the description which follows and, in part, will be apparent from the description, or may be learned by practice of the invention.

Exemplary embodiments of the present invention provide a three-dimensional image display apparatus having a display panel including pixels connected to gate lines and data lines, each pixel having a first capacitor and a second capacitor; an image display control unit configured to drive the gate lines and data lines so as to provide the display panel with a left eye image signal during a first frame in which a right eye image signal is displayed on the display panel, and with the right eye image signal during a second frame in which the left eye image signal is displayed on the display panel; and a backlight unit configured to provide a light to the display panel. During the first frame, each of the pixels provides the second capacitor with the right eye image signal, and the first capacitor with the left eye image signal. During the second frame, each of the pixels provides the first capacitor with the right eye image signal, and the second capacitor with the left eye image signal. The backlight unit maintains a turn-on state during the first and second frames.

An exemplary embodiment of the present invention also discloses a method of driving a three-dimensional image display apparatus, which includes receiving an image signal; dividing the image signal into a left eye image signal and a right eye image signal; turning on a backlight; transferring the left eye image signal in a first capacitor of a pixel; transferring the left eye image signal from the first capacitor to a second capacitor of the pixel; transferring the right eye image signal in the first capacitor; and transferring the right eye image signal from the first capacitor to the second capacitor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, directly connected to, directly coupled to, or directly adjacent to the other element or layer, or intervening elements or layers may be present. In contrast, when an element is referred to as being "directly on," "directly connected to", "directly coupled to", or "immediately adjacent to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
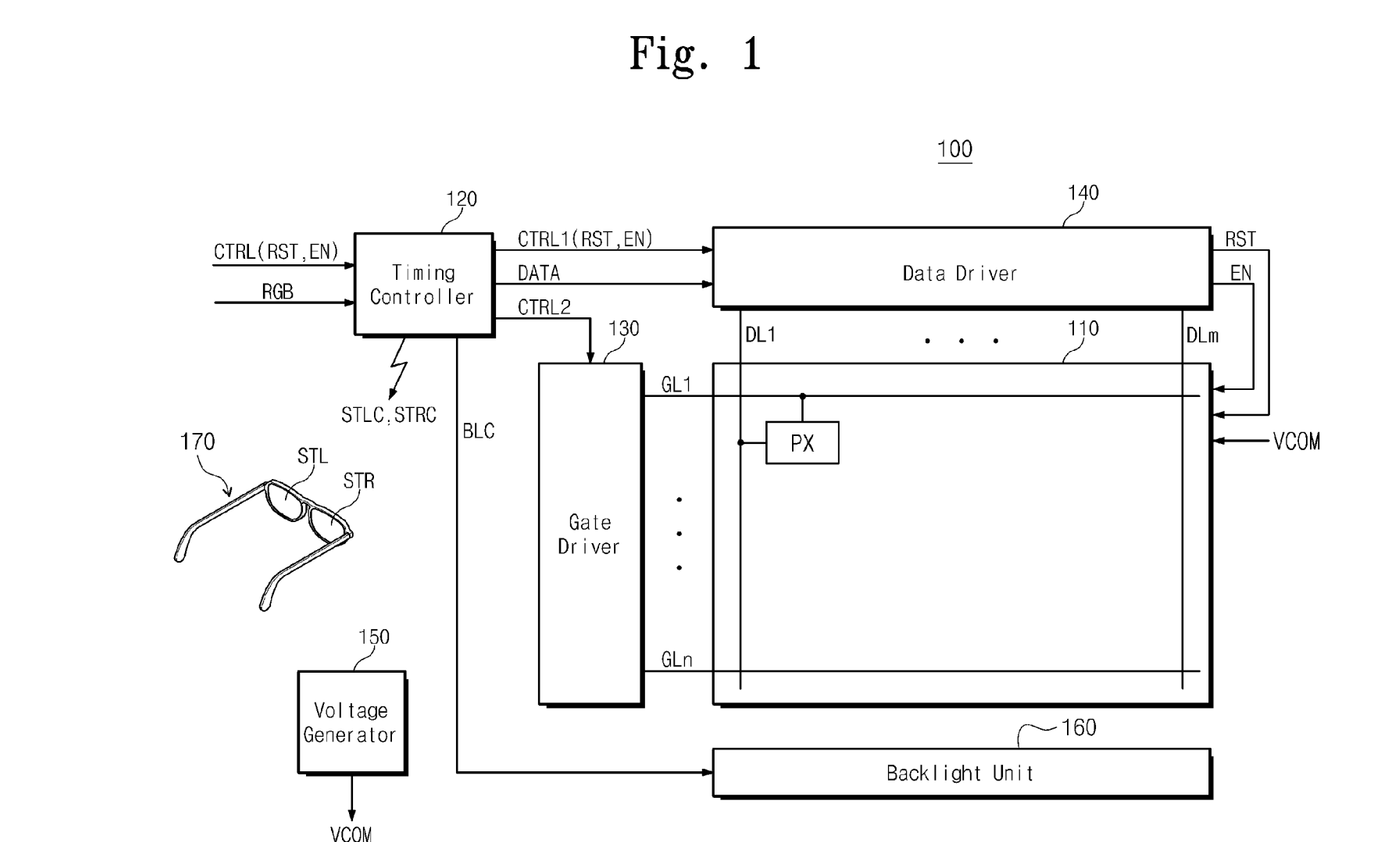
FIG. 1 is a block diagram schematically illustrating a display apparatus according to an exemplary embodiment of the present invention.

FIG. 1 is a block diagram schematically illustrating a display apparatus according to an exemplary embodiment of the present invention.

Referring to FIG. 1, a three-dimensional image display apparatus 100 includes a display panel 110, a timing controller 120, a gate driver 130, a data driver 140, a voltage generator 150, and a backlight unit 160. The three-dimensional image display apparatus 100 further includes shutter glasses 170. The timing controller 120, the gate driver 130, and the data driver 140 constitute an image display control unit that controls the display panel 110 to display an image.

The display panel 110 may be implemented by a liquid crystal display panel, an organic light emitting display panel, an electrophoretic display panel, an electrowetting display panel, etc. In exemplary embodiments, the display panel 110 may be implemented by the liquid crystal display panel.

The display panel 110 includes gate lines GL1 to GLn, data lines DL1 to DLm arranged to cross the gate lines GL1 to GLn, and pixels PX. The data lines DL1 to DLm and the gate lines GL1 to GLm are isolated from each other. Each of the pixels PX may be connected to a corresponding one of the gate lines GL1 to GLn and a corresponding one of the data lines DL1 to DLm. The pixels PX all have the same structure. For ease of description, a structure of one pixel is described.

The timing controller 120 is provided with an image signal RGB and control signals CTRL (e.g., a vertical synchronization signal, a horizontal synchronization signal, a main clock signal, a data enable signal, etc.) from an external device. Based on the control signals CTRL, the timing controller 120 provides a data signal DATA and a first control signal CTRL1 to the data driver 140, and a second control signal CTRL2 to the gate driver 130. The first control signal CTRL1 may include a horizontal synchronization start signal, a clock signal, a line latch signal, a reset signal RST, and an enable signal EN. In exemplary embodiments, the reset signal RST and the enable signal EN are included in the first control signal CTRL1 so as to be provided to the display panel 110 through the data driver 140. However, the reset signal RST and the enable signal EN output from the timing controller 120 may alternatively be provided directly to the display panel 110.

The second control signal CTRL2 may include a vertical synchronization start signal, an output enable signal, and a gate pulse signal. The data signal DATA output from the timing controller 120 may comprise a left eye image signal and a right eye image signal. The timing controller 120 outputs a left eye image signal as the data signal DATA during a first frame F(K), and a right eye image signal as the data signal DATA during a second frame F(K+1). The first frame F(K) and the second frame F(K+1) are continuous in time. For example, the first frame F(K) is an odd-numbered frame, and the second frame F(K+1) is an even-numbered frame. On the other hand, the first frame F(K) may be an even-numbered frame, and the second frame F(K+1) may be an odd-numbered frame.

The frequency of the data signal DATA output from the timing controller 120 is twice that of the image signal RGB.

For example, when a frequency of the image signal RGB is 60 Hz, a frequency of the data signal DATA is 120 Hz.

The timing controller 120 outputs a backlight control signal BLC for controlling a backlight unit 160, a left eye shutter control signal STLC for controlling a left eye shutter of the shutter glasses 170, and a right eye shutter control signal STRC for controlling a right eye shutter of the shutter glasses 170.

The data driver 140 drives the data lines DL1 to DLm in response to the data signal DATA and the first control signal CTRL1 received from the timing controller 120. The data lines DL1 to DLm are driven by a data voltage corresponding to the data signal DATA.

The gate driver 130 drives the gate lines GL1 to GLn in response to the second control signal CTRL2 from the timing controller 120. The gate driver 130 may be implemented by a tape carrier package (TCP) or a chip on film (COF). In other exemplary embodiments, the gate driver 130 is implemented by a circuit using ASG (Amorphous Silicon Gate) using an amorphous Silicon Thin Film Transistor (a-Si TFT), an oxide semiconductor, a crystalline semiconductor, a polycrystalline semiconductor, etc., and is integrated on a part of the display panel 110.

The voltage generator 150 generates a common voltage VCOM. The voltage generator 150 may also generate various other voltages for operation of the three-dimensional image display apparatus 100.

The backlight unit 160 is disposed at a lower part of the display panel 110 to be opposite to the pixels PX. The backlight unit 160 is turned on or off by the backlight control signal BLC from the timing controller 120.

The shutter glasses 170 open and close a left eye shutter STL in response to the left eye shutter control signal STLC from the timing controller 120, and a right eye shutter STR in response to the right eye shutter control signal STRC therefrom. The timing controller 120 may include a wireless transmission unit for sending the left eye shutter control signal STLC and the right eye shutter control signal STRC in a wireless manner. Also, the shutter glasses 170 may include a wireless reception unit for receiving the left eye shutter control signal STLC and the right eye shutter control signal STRC. While a left eye image is displayed on the display panel 110, the left eye shutter STL of the shutter glasses 170 is opened and the right eye shutter STR thereof is closed. While a right eye image is displayed on the display panel 110, the left eye shutter STL of the shutter glasses 170 is closed and the right eye shutter STR thereof is opened. Thus, a user wearing the shutter glasses 170 sees a three-dimensional image.

Figure 2:
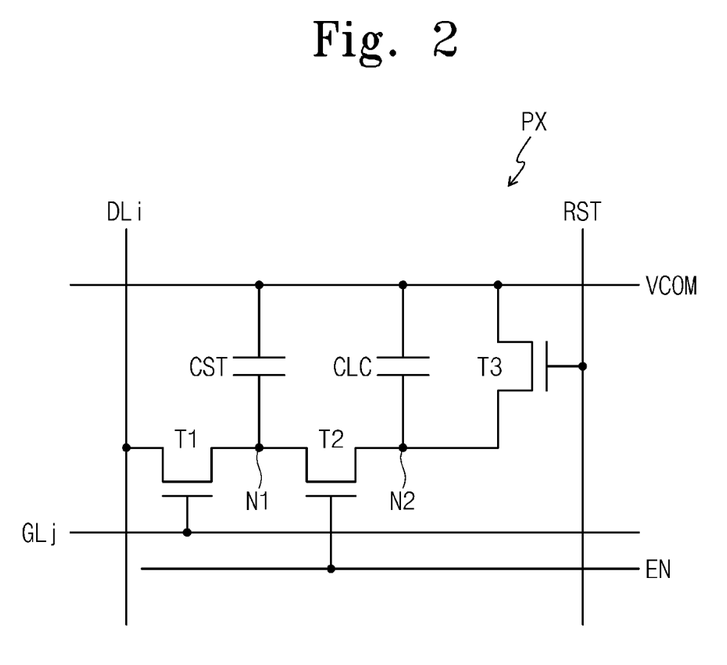
FIG. 2 is a circuit diagram schematically illustrating a pixel shown in FIG. 1, according to an exemplary embodiment of the present invention.

FIG. 2 is a circuit diagram schematically illustrating a pixel shown in FIG. 1, according to an exemplary embodiment of the present invention.

Referring to FIG. 2, a pixel PX includes first, second, and third transistors T1, T2, and T3, and first and second capacitors CST and CLC. The first transistor T1 is connected between a first node N1 and a corresponding one of the data lines DL1 to DLm shown in FIG. 1, and has a gate terminal connected to a corresponding one the gate lines GL1 to GLn shown in FIG. 1. The second transistor T2 is connected between the first node N1 and a second node N2, and has a gate terminal connected to receive an enable signal EN. The third transistor T3 is connected between a common voltage VCOM and the second node N2, and has a gate terminal connected to receive a reset signal RST.

The first capacitor CST is connected between the first node N1 and the common voltage VCOM, and the second capacitor CLC is connected between the second node N2 and the common voltage VCOM. In exemplary embodiments, the second capacitor CLC is a liquid crystal capacitor.

Figure 3:
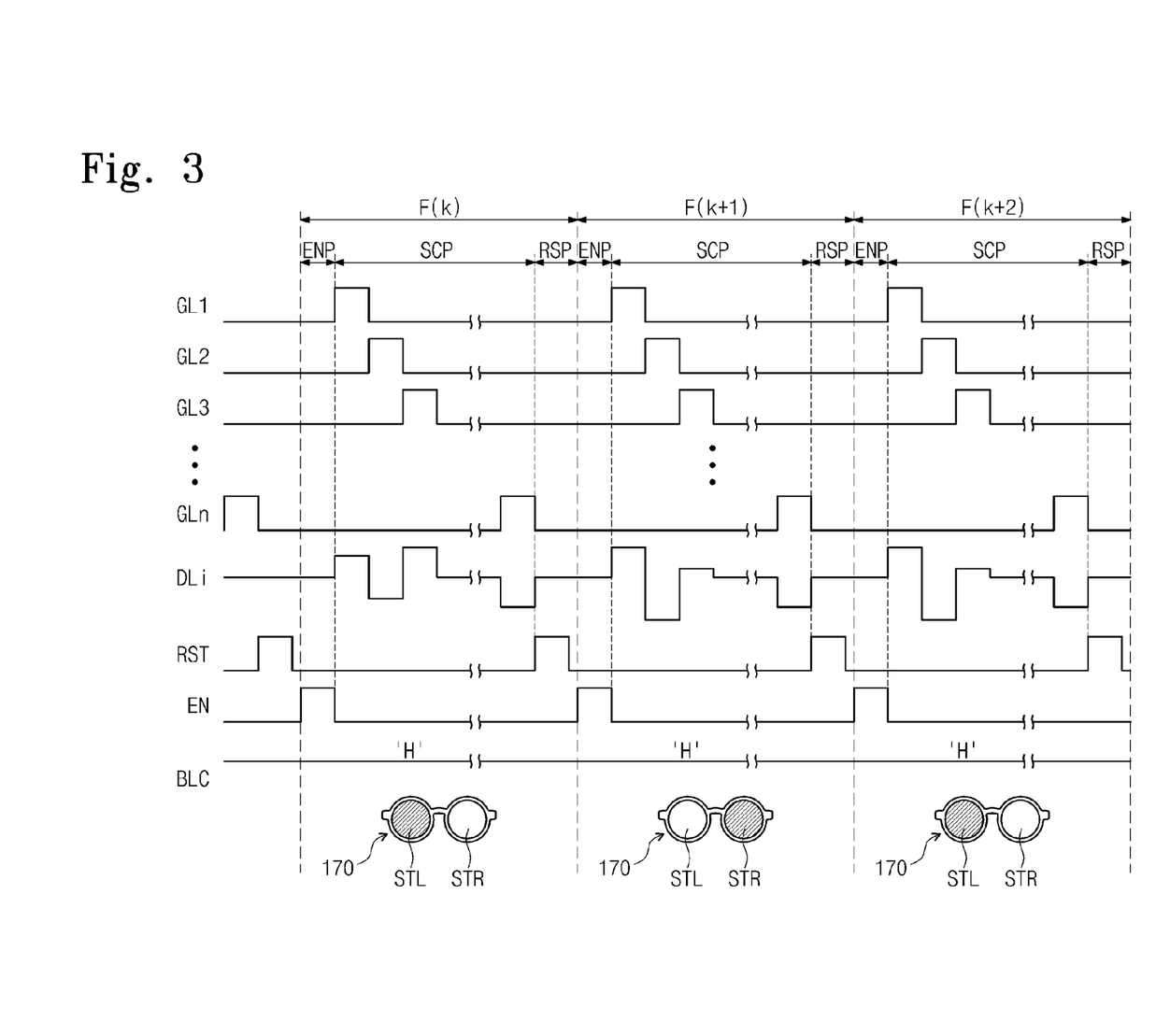
FIG. 3 is a timing diagram describing an operation of a display apparatus shown in FIGS. 1 and 2.
Figure 4:
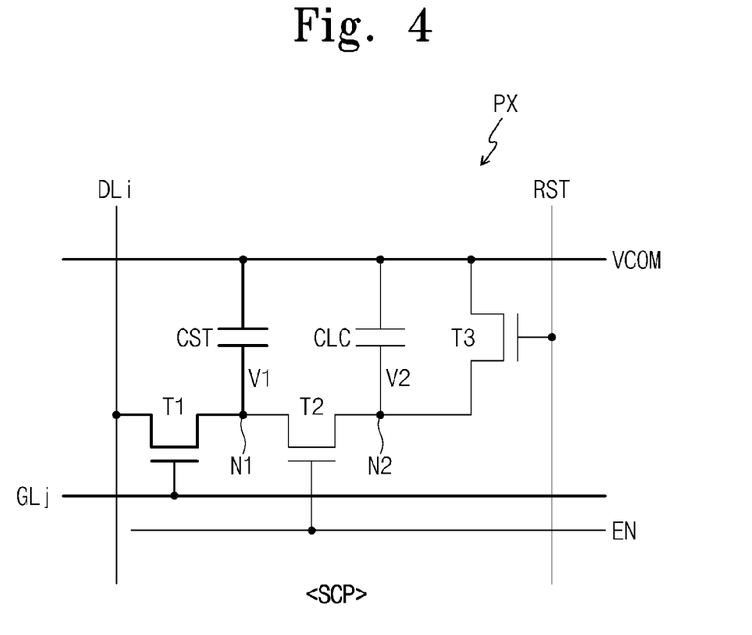
FIGS. 4, 5, and 6 are diagrams for describing an operation of the pixel shown in FIG. 2.
Figure 5:
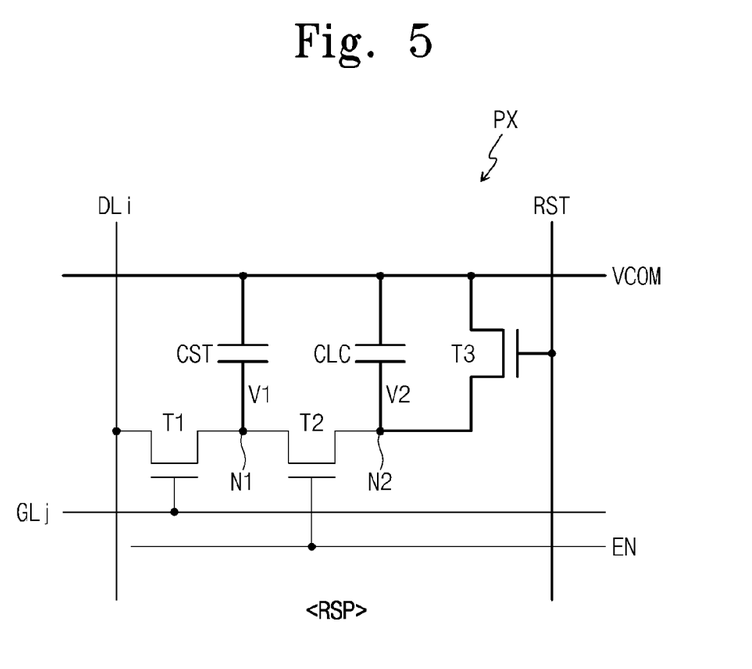
Figure 6:
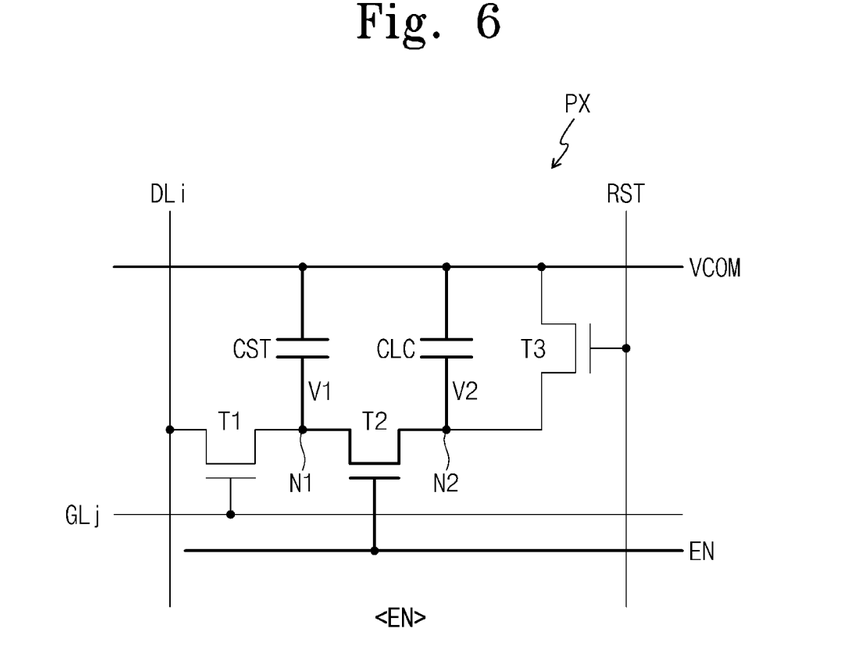

FIG. 3 is a timing diagram describing an operation of the display apparatus shown in FIGS. 1 and 2. FIGS. 4 to 6 are diagrams describing an operation of the pixel shown in FIG. 2.

Referring to FIGS. 3 to 6, each of a first frame F(K) and a second frame F(K+1) includes an enable period ENP, a scanning period SCP, and a reset period RSP. First, the scanning period SCP of the first frame F(K) is described with reference to FIG. 4. During the scanning period SCP, gate lines GL1 to GLn are sequentially driven by a gate-on voltage. When the gate line GLj shown in FIG. 2 is driven by the gate-on voltage, a first transistor T1 of a pixel PX is turned on. At this time, a data voltage provided through a data line DLi is transferred to a first capacitor CST.

After all gate lines GL1 to GLn are scanned, a third transistor T3 is turned on when a reset signal RST transitions to a high level during the reset period RSP of the first frame F(K), as shown in FIG. 5. As the third transistor T3 is turned on, a second node N2 is set to the same voltage as a common voltage VCOM.

If an enable signal EN transitions to a high level during the enable period ENP of the second frame F(K+1), a second transistor T2 is turned on, as shown in FIG. 6. Thus, a data voltage of the first node N1 is transferred to a second capacitor C2 connected to the second node N2. In each pixel PX of a display panel 110 shown in FIG. 1, a charge of a first capacitor CST is transferred to the second capacitor CLC when the enable signal EN is high.

In the event that data voltages transferred through data lines DL1 to DLm during the scanning period SCP of the first frame F(K) correspond to a left eye image signal, an image to be displayed on the display panel 110 during the second frame F(K+1) may be a left eye image signal. Thus, the timing controller 110 shown in FIG. 1 outputs a left eye shutter control signal STLC and a right eye shutter control signal STRC such that during the second frame F(K+1), a left eye shutter STL of shutter glasses 170 is opened and a right eye shutter STR thereof is closed.

During the scanning period SCP of the second frame F(K+1), a data voltage corresponding to a right eye image signal is stored in the first capacitor CST of a pixel PX, as shown in FIG. 4. During the reset period RSP of the second frame F(K+1), a third transistor T3 is turned on in response to a reset signal RST, as shown in FIG. 5.

If the enable signal EN transitions to a high level during the enable period ENP of a third frame F(K+2), a second transistor T2 is turned on, as shown in FIG. 6. At this time, a data voltage of the first node N1 is transferred to the second capacitor C2 connected to the second node N2. An image displayed on the display panel 110 during the third frame F(K+2) is a right eye image signal. Thus, the timing controller 110 outputs the left eye shutter control signal STLC and the right eye shutter control signal STRC such that during the third frame F(K+2), the left eye shutter STL of the shutter glasses 170 is closed and the right eye shutter STR is opened.

While a display apparatus 100 operates, the timing controller 120 outputs the backlight control signal BLC having a high level. Thus, a backlight unit 160 always maintains an on state.

The display apparatus 100 including a pixel PX shown in FIG. 2 need not display a black image between the first frame F(K) for a display of a right eye image and the second frame F(K+1) for a display of a left eye image. Also, the display apparatus 100 does not periodic turn-on and turn-off of the backlight unit 160. Thus, it is possible to prevent a brightness of a three-dimensional image displayed on the display panel 110 from being reduced.

Referring to FIGS. 4 to 6, charges stored in the first capacitor CST may be transferred to the second capacitor CLC in a charge sharing manner. It is assumed that a common voltage VCOM is 0V for ease of calculation. If a data voltage transferred to the first node N1 during the scanning period SCP is V1, the amount of charge Q charged in the first capacitor CST is expressed by the following equation:

$$Q = C(CST) \times V1$$

where C(CST) indicates capacitance of the first capacitor CST.

As the third transistor T3 is turned on during the reset period RSP, a voltage V2 of the second node N2 is set to 0V, that is, the same voltage of the common voltage VCOM.

As the second transistor T2 is turned on during the enable period ENP, charges stored in the first capacitor CST are transferred to the second capacitor CLC. At this time, the voltage V2 of the second node N2 is expressed by the following equation:

$$V2 = \frac{C(CST)}{C(CST) + C(CLC)} \times V1$$

where C(CST) indicates capacitance of the first capacitor CST and C(CLC) indicates capacitance of the second capacitor CLC.

With a charge sharing characteristic, the voltage V2 transferred to the second node N2 is set to a voltage lower than the voltage V1 of the first node N1. This problem is solved by increasing the capacitance of the first capacitor CST or a level of a data voltage provided from a data driver 140.

It may be desirable to set a time corresponding to the enable period ENP considering a capacity of the first capacitor CST. That is, it may be desirable to set a time width of the enable period ENP so as to satisfy a time taken to discharge a charge stored in the first capacitor CST and a time taken to store a charge in the second capacitor CLC.

Figure 7:
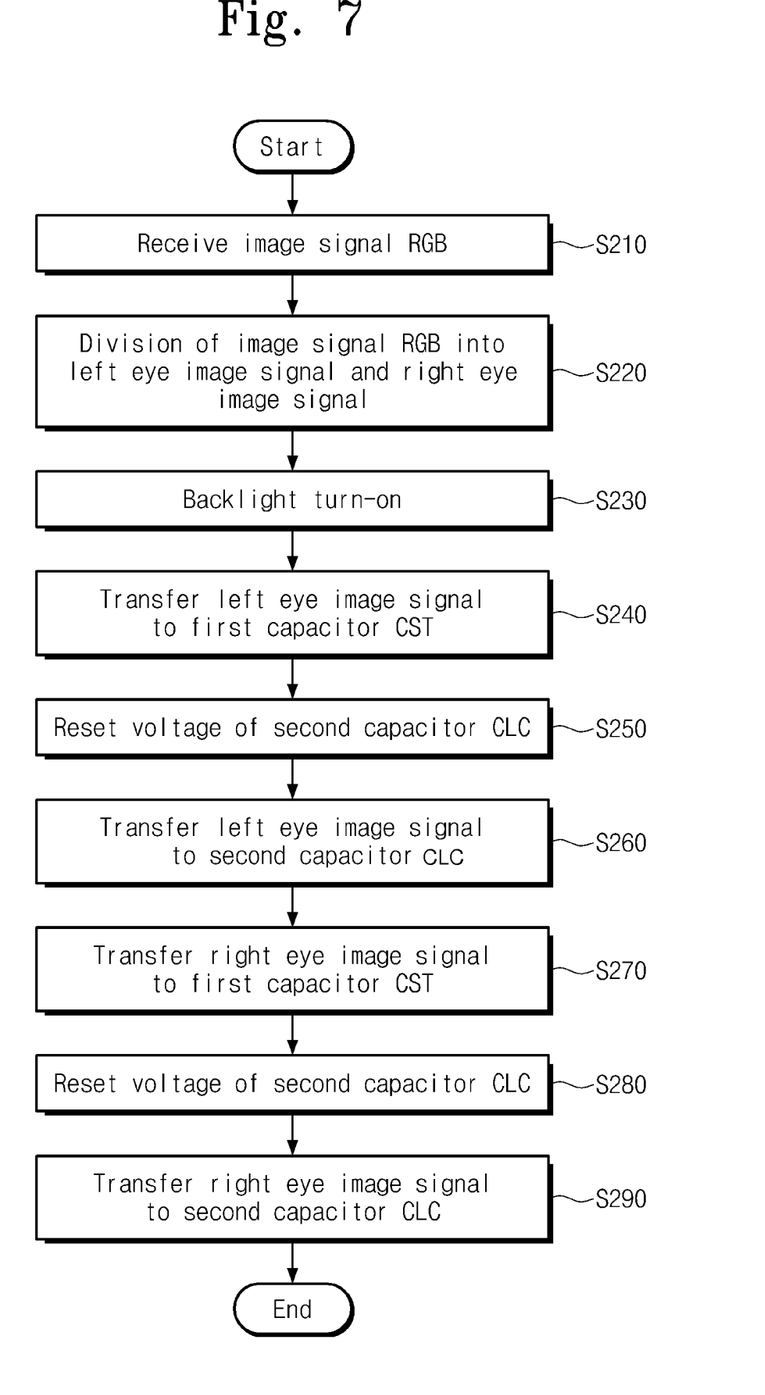
FIG. 7 is a flow chart schematically illustrating a driving method of a three-dimensional image display apparatus according to an exemplary embodiment of the present invention.

FIG. 7 is a flow chart schematically illustrating a driving method of a three-dimensional image display apparatus according to an exemplary embodiment of the present invention. For ease of description, a driving method of a three-dimensional image display apparatus is described referring to the three-dimensional image display apparatus shown in FIGS. 1 and 2.

Referring to FIGS. 1 and 7, in step S210, a timing controller 120 receives an image signal RGB from an external device. In step S220, the timing controller 120 divides the image signal RGB into a left eye image signal and a right eye image signal. The timing controller 120 outputs a left eye image signal as a data signal DATA during a first frame F(K) and a right eye image signal as the data signal DATA during a second frame F(K+1). The first frame F(K) and the second frame F(K+1) are continuous in time. For example, the first frame F(K) may be an odd-numbered frame, and the second frame F(K+1) may be an even-numbered frame.

In step S230, a backlight unit 160 is turned on. The backlight unit 160 is turned on or off by a backlight control signal BLC from the timing controller 120.

First, the timing controller 120 outputs the left eye image signal as the data signal DATA. In step S240, the left eye image signal is transferred to a first capacitor CST when a first transistor T1 of a pixel PX shown in FIG. 2 is turned on.

If a reset signal RST provided from the timing controller 120 transitions to a high level, a third transistor T3 is turned on. Thus, in step S250, the voltage of a second node N2 of a second capacitor CLC is reset to the same voltage as a common voltage VCOM.

If an enable signal EN transitions to a high level, a second transistor T2 is turned on. Thus, in step S260, charges corresponding to the left eye image signal stored in the first capacitor CST are transferred to the second capacitor CLC.

The timing controller 120 outputs the right eye image signal as the data signal DATA. If the first transistor T1 of the pixel PX shown in FIG. 2 is turned on, in step S270, the right eye image signal is transferred to the first capacitor CST.

If the reset signal RST provided from the timing controller 120 transitions to a high level, the third transistor T3 is turned on. Thus, in step S280, the voltage of the second node N2 of the second capacitor CLC is reset to the same voltage as the common voltage VCOM.

If the enable signal EN transitions to a high level, a second transistor T2 is turned on. Thus, in step S290, charges corresponding to the right eye image signal stored in the first capacitor CST are transferred to the second capacitor CLC.

While the voltage of the second capacitor CLC is reset after the left eye image signal is transferred to the first capacitor CST, the right eye image signal is displayed on a display panel 110. Thus, the timing controller 120 outputs a left eye shutter control signal STLC and a right eye shutter control signal STRC to open a right eye shutter STR of shutter glasses 170 and close a left eye shutter STL.

While the voltage of the second capacitor CLC is reset after the right eye image signal is transferred to the first capacitor CST, the left eye image signal is displayed on the display panel 110. Thus, the timing controller 120 outputs the left eye shutter control signal STLC and the right eye shutter control signal STRC to close the right eye shutter STR of shutter glasses 170 and open the left eye shutter STL.

While a display apparatus 100 operates, the timing controller 120 outputs the backlight control signal BLC having a high level. Thus, a backlight unit 160 constantly maintains an on state.

With the above-described driving method of the three-dimensional image display apparatus, it is unnecessary to display a black image between the first frame F(K) for a display of a right eye image and the second frame F(K+1) for a display of a left eye image. Also, it is unnecessary to periodically turn on and off the backlight unit 160. Thus, it is possible to prevent a brightness of a three-dimensional image displayed on the display panel 110 from being reduced.

It is to be understood that both the foregoing general description and the following detailed description are exemplary and explanatory and are intended to provide further explanation of the invention as claimed.

What is claimed is:

1. A three-dimensional image display apparatus, comprising:
   a display panel comprising pixels connected to gate lines and data lines, each pixel comprising a first capacitor and a second capacitor, the first capacitor comprising a first terminal and a second terminal, and the second capacitor comprising a third terminal and a fourth terminal;

an image display control unit configured to provide each of the pixels, via the gate lines and the data lines, with a left eye image signal during a first frame where a right eye image signal is displayed on the display panel, and to provide the display panel with the right eye image signal during a second frame where the left eye image signal is displayed on the display panel; and a backlight unit configured to provide light to the display panel, wherein:

during the first frame, in each of the pixels, the first terminal of the second capacitor is provided with the right eye image signal and the first capacitor is provided with the left eye image signal;

during the second frame, in each of the pixels, the third terminal of the first capacitor is provided with the right eye image signal and the second capacitor is provided with the left eye image signal;

the backlight unit is configured to maintain a turned-on state during the first and second frames; and the second terminal of the first capacitor and the fourth terminal of the second capacitor are connected to a common voltage.

2. The three-dimensional image display apparatus of claim 1, further comprising shutter glasses configured to open a right eye shutter during the first frame and a left eye shutter during the second frame.

3. The three-dimensional image display apparatus of claim 2, wherein the timing controller is configured to output a left eye shutter control signal to control the left eye shutter and a right eye shutter control signal to control the right eye shutter.

4. The three-dimensional image display apparatus of claim 3, wherein the timing controller is configured to output the left eye shutter control signal and the right eye shutter control signal such that the right eye shutter is opened during the first frame, and the left eye shutter is opened during the second frame.

5. The three-dimensional image display apparatus of claim 1, wherein the image display control unit comprises:
a gate driver configured to drive the gate lines;
a data driver configured to drive the data lines; and
a timing controller configured to receive an image signal,
wherein:
the timing controller is configured to provide a first control signal to the data driver and a second control signal to the gate driver; and
the timing controller is configured to provide the data driver with the left eye image signal during the first frame and to provide the right eye image signal during the second frame.

6. The three-dimensional image display apparatus of claim 5, wherein each of the pixels comprises:
a first transistor connected between a corresponding one of the data lines and a first node, the first transistor comprising a gate terminal connected to a corresponding one of the gate lines;
a second transistor connected between the first node and a second node, the second transistor comprising a gate terminal configured to receive an enable signal; and
a third transistor connected between the common voltage and the second node, the third transistor comprising a gate terminal configured to receive a reset signal, and
wherein the first capacitor is connected between the first node and the common voltage, and the second capacitor is connected between the second node and the common voltage.

7. The three-dimensional image display apparatus of claim 6, wherein the second capacitor is a liquid crystal capacitor.

8. The three-dimensional image display apparatus of claim 6, wherein a first control signal output from the timing controller comprises the enable signal and the reset signal.

9. The three-dimensional image display apparatus of claim 8, wherein the timing controller is configured to output the reset signal during a reset period following a scan period where the gate lines are sequentially driven by a gate-on voltage.

10. The three-dimensional image display apparatus of claim 9, wherein the timing controller is configured to output the enable signal during an enable period following the reset period.

11. The three-dimensional image display apparatus of claim 10, wherein each of the first and second frames comprises the enable period, the scan period, and the reset period.

12. The three-dimensional image display apparatus of claim 1, wherein the first and second frames are continuous in time.

13. The three-dimensional image display apparatus of claim 12, wherein the first frame is an odd-numbered frame and the second frame is an even-numbered frame.

14. The three-dimensional image display apparatus of claim 1, wherein the timing controller is configured to output a backlight control signal that controls the backlight unit.

15. The three-dimensional image display apparatus of claim 14, wherein the timing controller is configured to output the backlight control signal such that the backlight unit is turned on during the first and second frames.

16. A method of driving a three-dimensional image display apparatus, comprising:
receiving an image signal;
dividing the image signal into a left eye image signal and a right eye image signal;
turning on a backlight;
transferring the left eye image signal in a first terminal of a first capacitor of a pixel;
transferring the left eye image signal from the first capacitor to a third terminal of a second capacitor of the pixel;
transferring the right eye image signal in the first capacitor; and
transferring the right eye image signal from the first capacitor to the second capacitor,
wherein a second terminal of the first capacitor and a fourth terminal of the second capacitor are connected to a common voltage.

17. The method of claim 16, further comprising maintaining a turned-on state while the left eye image signal is transferred to the second capacitor from the first capacitor, and while the right eye image signal is transferred to the second capacitor from the first capacitor.

18. The method of claim 16, further comprising resetting a voltage of the second capacitor after the left eye image signal is transferred to the first capacitor.

19. The method of claim 18, further comprising resetting a voltage of the second capacitor after the right eye image signal is transferred to the first capacitor.

20. The method of claim 19, further comprising opening a right eye shutter of shutter glasses during the resetting of the second capacitor after the left eye image signal is transferred to the first capacitor, and opening a left eye shutter of the shutter glasses during the resetting of the second capacitor after the right eye image signal is transferred to the first capacitor.

* * * * *